US010182067B2

(12) United States Patent
Zhou et al.

(10) Patent No.: US 10,182,067 B2
(45) Date of Patent: Jan. 15, 2019

(54) METHOD, DEVICE AND STORAGE MEDIUM FOR DETERMINING HEALTH STATE OF INFORMATION SYSTEM

(71) Applicant: TENCENT TECHNOLOGY (SHENZHEN) COMPANY LIMITED, Shenzhen (CN)

(72) Inventors: Bin Zhou, Shenzhen (CN); Dong Shan Xu, Shenzhen (CN); Shan Yang Fu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 431 days.

(21) Appl. No.: 14/591,318

(22) Filed: Jan. 7, 2015

(65) Prior Publication Data

US 2015/0127989 A1    May 7, 2015

Related U.S. Application Data

(63) Continuation of application No. PCT/CN2014/082154, filed on Jul. 14, 2014.

(30) Foreign Application Priority Data

Aug. 7, 2013    (CN) .......................... 2013 1 0342173

(51) Int. Cl.
*H04L 29/06*    (2006.01)
*G06F 11/34*    (2006.01)

(52) U.S. Cl.
CPC ...... *H04L 63/1433* (2013.01); *G06F 11/3452* (2013.01)

(58) Field of Classification Search
CPC ................................................. H04L 63/1433
(Continued)

(56) References Cited

U.S. PATENT DOCUMENTS 7,072,871 B1    7/2006 Tinnemeyer
7,181,505 B2    2/2007 Haller et al.
(Continued)

FOREIGN PATENT DOCUMENTS

CN    101470779 A    7/2009
CN    101727627 A    6/2010

OTHER PUBLICATIONS

Office Action with Translation Issued in Chinese Application No. 201310342173.7 dated Jan. 25, 2018.
(Continued)

*Primary Examiner* — Khalil Naghdali
(74) *Attorney, Agent, or Firm* — Knobbe Martens Olson & Bear LLP (57) ABSTRACT

The present disclosure relates to a method, a device and a storage medium for determining a health state of an information system. At first, a baseline configuration document corresponding to the information system is received, and data records under inspection of the information system are acquired. The baseline configuration document defines baselines. Then, each of the data records under inspection is compared with at least one baseline defined in the baseline configuration document to obtain a comparing result between each of the data records under inspection and the at least one baseline. At last, the health state of the information system is determined according to the comparing result between each of the data records under inspection and the at least one baseline. A health-determining apparatus relative to the above-mentioned method is also provided. Therefore, by these method and apparatus, the health state of the information system is quantifiable.

12 Claims, 6 Drawing Sheets

(58) Field of Classification Search
USPC .......................................................... 726/22
See application file for complete search history.

(56) References Cited

U.S. PATENT DOCUMENTS

| | | | |
|---|---|---|---|
| 7,506,371 B1* | 3/2009 | Ben-Natan | G06F 21/316 |
| | | | 726/18 |
| 7,913,182 B2 | 3/2011 | Bear et al. | |
| 2008/0313739 A1* | 12/2008 | Martin | G06F 21/577 |
| | | | 726/25 |
| 2009/0024663 A1* | 1/2009 | McGovern | G06F 21/577 |
| 2017/0340293 A1* | 11/2017 | Al-Ali | A61B 5/7275 |

OTHER PUBLICATIONS

Peng, Xiao, "Research on safety baseline risk assessment technology" Chinese Excellent Master's Degree Thesis, Information Science and Technology, $3^{rd}$ Issue, pp. 20-29, Mar. 15, 2011.

Binying, He, "Security Baseline for Network Equipment Configuration" Sep. 2012.

Hu, Zhenyu "Risk analysis of E-government cloud computing system" with Translation, Confidential Science and Technology, $9^{th}$ Issue, pp. 27-33, Sep. 30, 2012.

Xinxinl et al., "A Network Vulnerability Assessment System Based on CVSS", 1994-2014 China Academic Journal Electronic Publishing House.

\* cited by examiner

METHOD, DEVICE AND STORAGE MEDIUM FOR DETERMINING HEALTH STATE OF INFORMATION SYSTEM

CROSS-REFERENCE

This application is a U.S. continuation application under 35 U.S.C. § 111(a) claiming priority under 35 U.S.C. §§ 120 and 365(c) to International Application No. PCT/CN2014/081254 filed on Jul. 14, 2014, which claims the priority benefit of Chinese Patent Application No. CN201310342173.7, filed on Aug. 7, 2013, which are hereby incorporated herein by reference in its entirety.

DATA FIELD OF THE INVENTION

The present disclosure relates to security technology, particularly relates to a method, a device and a storage medium for determining a health state of an information system.

BACKGROUND OF THE INVENTION

With rapid growth of data processing services and network complexity of information systems such as data center systems and office information systems, data flow between various devices increases explosively. More and more malicious attacks will affect the security and health of the information systems. Therefore, an effective method for determining whether an information system is safe and determining whether the information system should be optimized is required. Since the health/security state of the information system directly affects performance of the information system, determining the health/security state of the information system in advance can ensure normal operation of the information system and even achieve in best mode or condition.

So far, the health (security) state of the information system is determined by manual monitoring according to experiences of MIS (management information system) staff. The MIS staff acquires several indicators from networking devices, and then estimates the health state of the information system according to the indicators and individual experience. While acquiring better indicators during normal functioning of the networking devices, the MIS staff usually judges that the health state of the information system is higher. Otherwise, the information system is judged as in a lower health state.

According to the manual method for determining the health state of the information system, only several indicators are actually utilized. The obtained health state does not reflect the real health state of the information system. Thus, the monitoring effect is not satisfied. Furthermore, since the networking environment changes rapidly and the network complexity increases very fast, it is difficult for the MIS staff to check huge data of increasing indicators effectively or adjust the acquired indicators with the times properly. Another problem is that since the acquired indicators from the networking devices are analyzed according to the individual experience without fixed criterion, the judging results are not objective, and different MIS staffs may give different or even conflicting results about the health state of the information system. This situation is disadvantageous to management of the information system. In summary, the current manual method can not provide an accurate and complete health state estimation in an effective manner.

SUMMARY

The present disclosure provides a method for determining a health state of an information system and a relative health-determining apparatus to obtain a quantifiable and accurate health state of the information system.

An aspect of the present disclosure provides a method for determining a health state of an information system. At first, a baseline configuration document corresponding to the information system is received, and data records under inspection of the information system are acquired. The baseline configuration document defines baselines. Then, each of the data records under inspection is compared with at least one baseline defined in the baseline configuration document to obtain a comparing result between each of the data records under inspection and the at least one baseline. At last, the health state of the information system is determined according to the comparing result between each of the data records under inspection and the at least one baseline.

Another aspect of the present disclosure provides a health-determining apparatus. The health-determining apparatus includes an acquiring module, a matching module and a determining module. The acquiring module is configured to receive a baseline configuration document corresponding to the information system and acquire data records under inspection of the information system. The baseline configuration document defines baselines. The matching module is configured to compare each of the data records under inspection with at least one baseline defined in the baseline configuration document to obtain a comparing result between each of the data records under inspection and the at least one baseline. The determining module is configured to determine the health state of the information system according to the comparing result between each of the data records under inspection and the at least one baseline.

Yet another aspect of the present disclosure provides non-transitory computer-readable storage medium storing instructions for determining a health state of an information system in a computer, the computer including a processor operating in conjunction with a memory. The instructions includes: receiving a baseline configuration document corresponding to the information system and acquiring data records under inspection of the information system, the baseline configuration document defining a plurality of baselines; comparing each of the data records under inspection with at least one baseline defined in the baseline configuration document to obtain a comparing result between each of the data records under inspection and the at least one baseline; and determining the health state of the information system according to the comparing result between each of the data records under inspection and the at least one baseline.

The present disclosure compares each data record under inspection with at least one baseline defined in the baseline configuration document to obtain a comparing result between each data record under inspection and at least one baseline. The health state of the information system is determined according to the comparing result. The present disclosure provides an accurate and complete health state which solves the problems resulting from the conventional manual determination. Thus, the health state of the information system becomes a quantifiable indicator determined by automatic determination with advantage of rapid, convenience, accuracy and objectiveness. It is advantageous to production decision and security management of the information system. In addition, greater efficiency of security management and lower security cost without planless waste are achieved.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of embodiments of this invention are presented herein for purpose of illustration and description only. It is not intended to be exhaustive or to be limited to the precise form disclosed.

Figure 1:
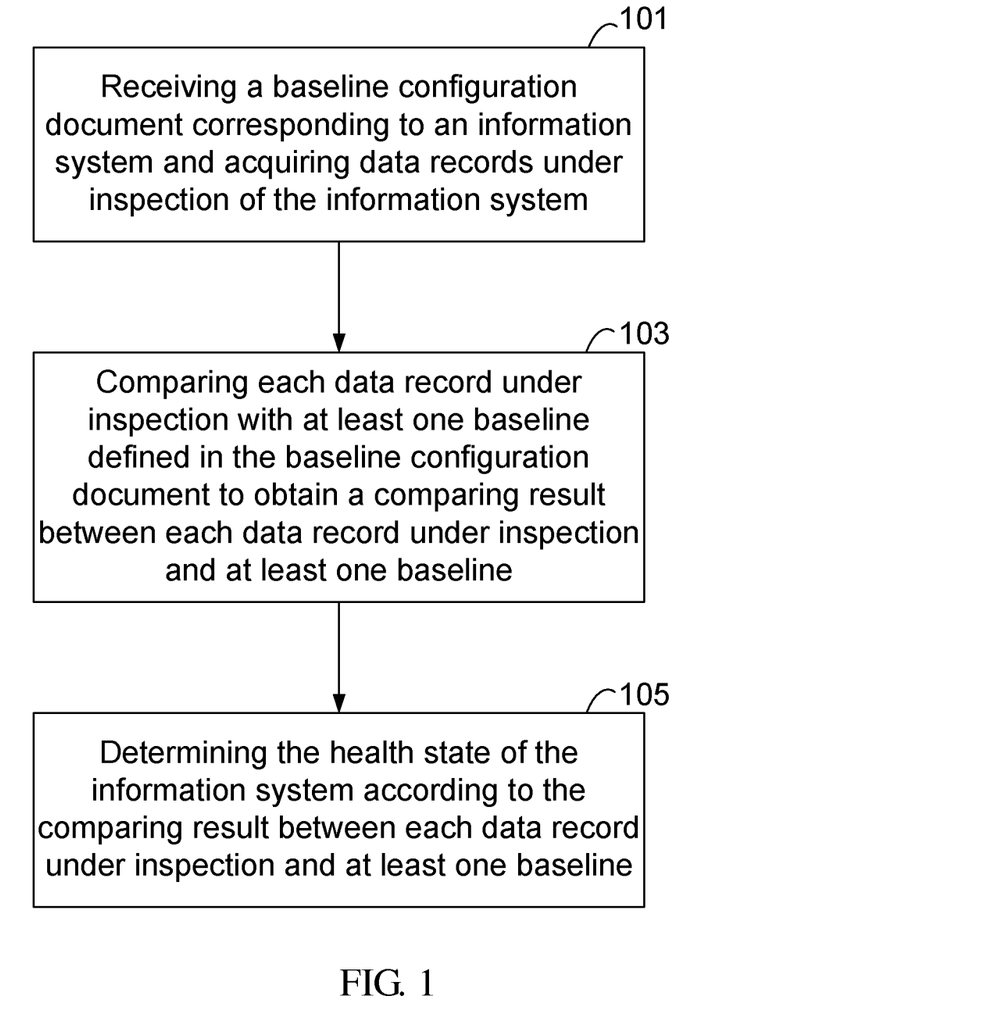
FIG. 1 is a flow chart illustrating a method for determining a health state of an information system according to an embodiment of the present invention.

Please refer to FIG. 1, a flow chart illustrating a method for determining a health state of an information system according to an embodiment of the present invention. The method can be executed with a health-determining apparatus for determining a health state of an information system. The health-determining apparatus may be a computer which will be described in other embodiments. The method includes the following steps.

In step 101, a baseline configuration document corresponding to an information system is received and data records under inspection of the information system are acquired. The baseline configuration document defines baselines.

In an embodiment, the information system may be a data center system or an office information system. Each baseline is a predetermined standard which can prevent the information system from insecurity or damage. For example, the baseline may be defined that a weak password is not allowed; an account is set valid no more than three months; or opening a reserved port of the information system is not allowed, but is not limited to these conditions. The data records under inspection can be any data records acquired from the information system, e.g. password, account or open port information.

In step 103, each of the data records under inspection is compared with at least one baseline defined in the baseline configuration document to obtain a comparing result between each data record under inspection and the at least one baseline.

The comparing result between the data record under inspection and the baseline represents whether the data record under inspection meets or matches the baseline. For example, if the data record under inspection indicates that a password is 123456 and a baseline defines that a weak password is not allowed, the data record under inspection does not meet or match the baseline because 123456 is a weak password.

In step 105, the health state of the information system is determined according to the comparing result between each data record under inspection and the at least one baseline.

Optionally, all baselines are classified into several types according to their risk levels in advance, e.g. type-1 baselines, type-2 baselines, . . . , type-n baselines. The comparing result may include the number of the matched baselines relative to the data records under inspection in each type.

In summary, the method for determining a health state of an information system compares each data record under inspection with at least one baseline defined in the baseline configuration document to obtain a comparing result between each data record under inspection and at least one baseline. The health state of the information system is determined according to the comparing result. The present method provides an accurate and complete health state which solves the problems resulting from the conventional manual determination. Thus, the health state of the information system becomes a quantifiable indicator determined by automatic determination with advantage of rapid, convenience, accuracy and objectiveness. It is advantageous to production decision and security management of the information system. In addition, greater efficiency of security management and lower security cost without planless waste are achieved.

Figure 2A:
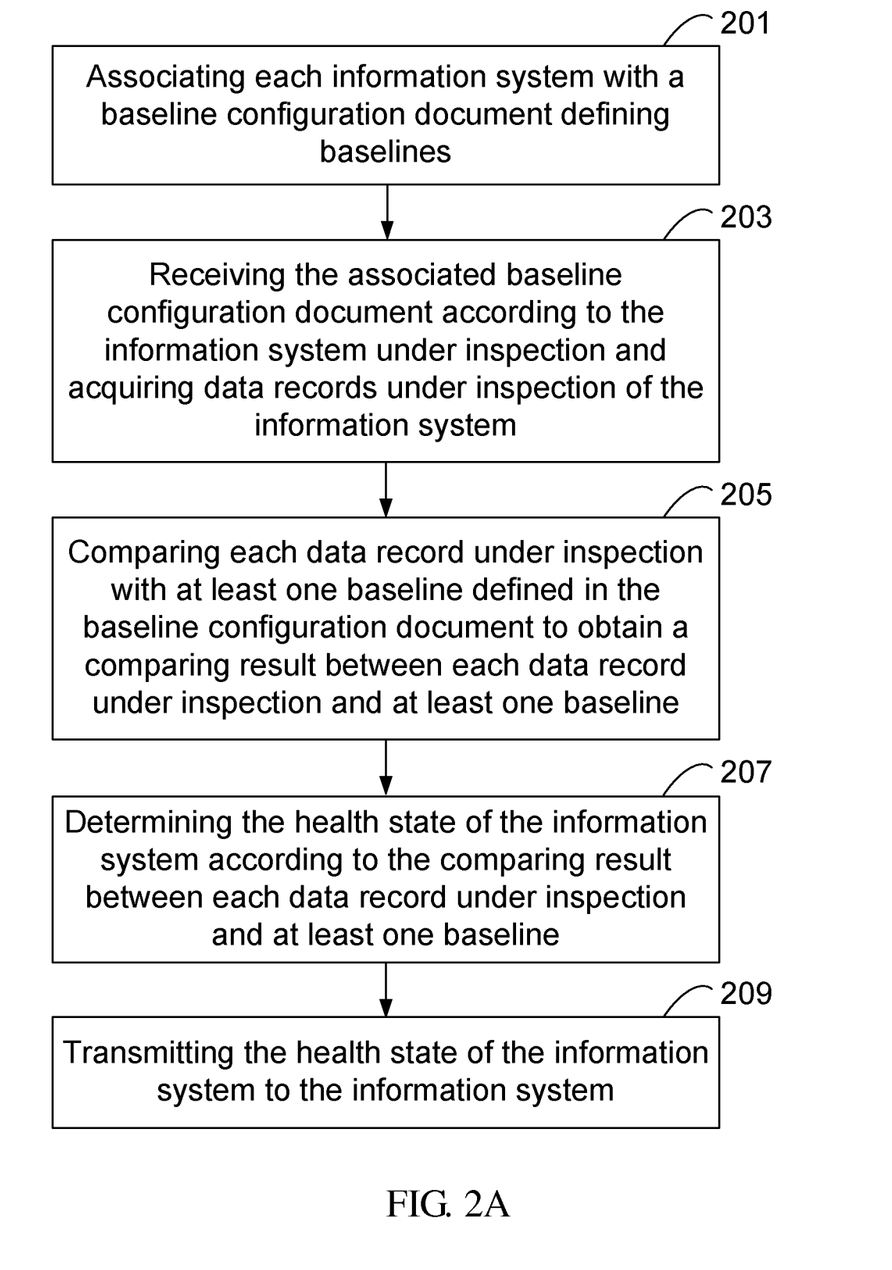
FIG. 2A is a flow chart illustrating a method for determining a health state of an information system according to another embodiment of the present invention.

Referring to FIG. 2A, a flow chart illustrating a method for determining a health state of an information system according to another embodiment of the present invention. The method may be performed with a health-determining apparatus which may be a computer. The method includes the following steps.

In step 201, each information system is associated with a baseline configuration document defining baselines.

In an embodiment, the information system may be a data center system or an office information system. Each baseline is a predetermined standard which can prevent the information system from insecurity or damage. For example, the baseline may be defined that a weak password is not allowed; an account is set valid no more than three months; or opening a reserved port of the information system is not allowed, but is not limited to these conditions.

Each information system is associated with a baseline configuration document. For example, an information system A corresponds to a baseline configuration document A1; and an information system B corresponds to a baseline configuration document B1. Concretely, an account management information system is associated with a baseline configuration document defining at least one baseline, for example, "a weak password is not allowed". A weak password is a simple password which is easily guessed by others. For example, simple combination of numbers and characters (e.g. 123456 or abc123), an account number, combination of adjacent keys (e.g. asdf), a short password and a popular name (e.g. Michael) are weak passwords. It is noted that the corresponding baseline configuration document for an information system can be adjusted at any time to meet real requirements.

In step 203, the associated baseline configuration document is received according to the information system under inspection and data records under inspection of the information system are acquired.

The data records under inspection can be any data records acquired from the information system, e.g. password, account or open port information. In an embodiment, the information system sent the data records under inspection to a health-determining apparatus to execute the method. In another embodiment, the health-determining apparatus accesses the information system to obtain the data records under inspection. For example, if the information system A is associated with the baseline configuration document A1, the baseline configuration document A1 is received to determine the health state of the information system A.

In step 205, each of the data records under inspection are compared with at least one baseline defined in the baseline configuration document to obtain a comparing result between each data record under inspection and the at least one baseline.

The comparing result between the data record under inspection and the baseline represents whether the data record under inspection meets the baseline. For example, if the data record under inspection indicates that a password is 123456 and a baseline defines that a weak password is not allowed, the data record under inspection does not meet or match the baseline because 123456 is a weak password.

In step 207, the health state of the information system is determined according to the comparing result between each data record under inspection and the at least one baseline.

Optionally, all baselines are classified into several types according to their risk levels in advance, e.g. type-1 baselines, type-2 baselines, . . . , type-n baselines. The comparing result may include the number of the matched baselines relative to the data records under inspection in each type.

In step 209, the health state of the information system is transmitted to the information system. Hence, the health state may be viewed or monitored through each terminal of the information system.

In summary, the method for determining a health state of an information system associates each information system with a baseline configuration document, and notifies the information system of the health state thereof. The connection between each information system and associated baseline configuration document can be adjusted at any time to meet real requirements. Thus, the method is flexible and convenient. In addition, the health state of the information system may be viewed or monitored through each terminal of the information system as required.

Figure 2B:
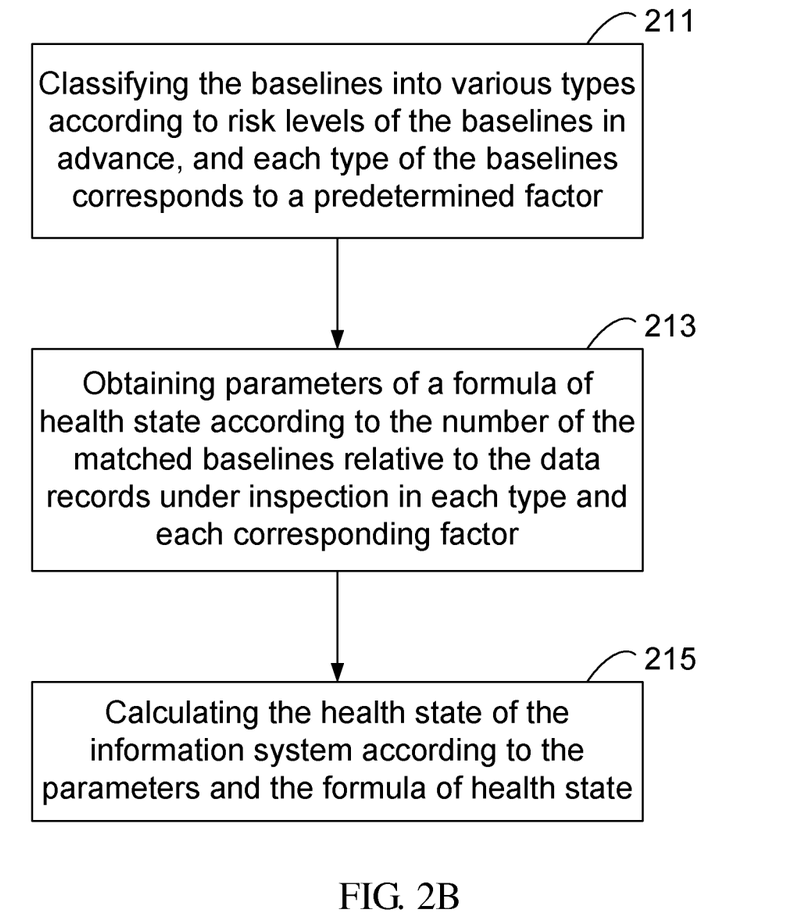
FIG. 2B is a flow chart illustrating sub-steps of the method in FIG. 2A.

Please refer to FIG. 2B, a flow chart illustrating sub-steps of the method in FIG. 2A. The step of determining the health state of the information system further includes the following steps.

In step 211, all of the baselines are classified into various types according to risk levels of the baselines in advance. Each type of the baselines corresponds to a predetermined factor. The comparing result includes the number of the matched baselines relative to the data records under inspection in each type.

For example, all baselines are classified into n types according to risk levels of the baselines, and n is a positive integer. In an embodiment, the baselines are classified into five types having baseline indicators B1~B5, respectively, i.e. extremely dangerous baselines (type-1 baselines), high risk baselines (type-2 baselines), medium risk baselines (type-3 baselines), low risk baselines (type-4 baselines) and prompting baselines (type-5 baselines). Violating the extremely dangerous baselines affects the information system most seriously, even crashing the information system. The high risk baseline is next, and so on. Table 1 shows the types of baselines and corresponding predetermined factors which may be adjusted.

TABLE 1

Types of baselines and corresponding predetermined factors

| Baseline indicator | Type of baseline | Factor |
|---|---|---|
| B1 | extremely dangerous | 40 |
| B2 | high risk | 30 |
| B3 | medium risk | 15 |
| B4 | low risk | 10 |
| B5 | prompting | 5 |

In step 213, parameters of a formula of health state are obtained according to the number of the matched baselines relative to the data records under inspection in each type and each corresponding factor.

If the baselines are classified into n types according to risk levels of the baselines (n is a positive integer), the formula of health state is:

$$\sum_{n=1}^{m} \left( \frac{\text{number of matched baselines in type } Bn}{\text{total number of baselines in type } Bn} * Bn \text{ factor} \right) \quad (1)$$

wherein m=1, 2, . . . , n; Bn is the baseline indicator; and Bn factor is a predetermined factor corresponding to type Bn.

In formula (1), if the baselines are classified into five types, the value of m is decided according to the following rules, wherein the risk level of type-1 baselines is greater than the risk level of type-2 baselines:

a. if there is any unmatched baseline relative to the data records under inspection in type B1 (type-1 baseline), m=1;

b. if there is no unmatched baseline relative to the data records under inspection in type B1 (type-1 baseline), but there is any unmatched baseline relative to the data records in type B2 (type-2 baseline), m=2; and c. if there is no unmatched baseline relative to the data records under inspection in type B1 and type B2, m=5.

In step 215, the health state of the information system is calculated according to the parameters and the formula of health state.

For example, there are ten data records under inspection, and at least one unmatched baseline relative to the data records under inspection in type B1 is found, so m is selected as 1. There are ten baselines in type B1, and two of which are matched baselines relative to the data records under inspection. Thus, the health state is:

$$\frac{\text{number of matched baselines in type } B1}{\text{total number of baselines in type } B1} * B1 \text{ factor} = 2/10 * 40 = 8.$$

For example, there are ten data records under inspection, and no unmatched baseline relative to the data records under inspection in type B1 but at least one unmatched baseline relative to the data records under inspection in type B2 is found, so m is selected as 2. There are ten baselines in both type B1 and type B2, while all of the baselines in type B2 are unmatched baselines relative to the data records under inspection. Thus, the health state is:

$$\frac{\text{number of matched baselines in type }B1}{\text{total number of baselines in type }B1} * B1 \text{ factor} +$$

$$\frac{\text{number of matched baselines in type }B2}{\text{total number of baselines in type }B2} * B2 \text{ factor} =$$

$$10/10 * 40 + 0/10 * 20 = 40.$$

From the above examples, it is noted that the health state of the information system is better when the value is greater, and vice versa. Therefore, the present method provides a quantifiable indicator to indicate the health state of the information system.

In summary, the method for determining the health state of the information system obtains the parameters of the formula of health state according to the number of matched baselines relative to the data records under inspection in each type and the corresponding factors. Then, the health state of the information system is calculated from the formula of health state. The health state of the information system becomes a quantifiable indicator determined by automatic determination with advantage of rapid, convenience, accuracy and objectiveness.

The present application further provides health-determining apparatuses operated with the above-described methods. Please refer to the above-described embodiments for detailed operation of the health-determining apparatuses, and similar particulars will not be given repeatedly.

Figure 3:
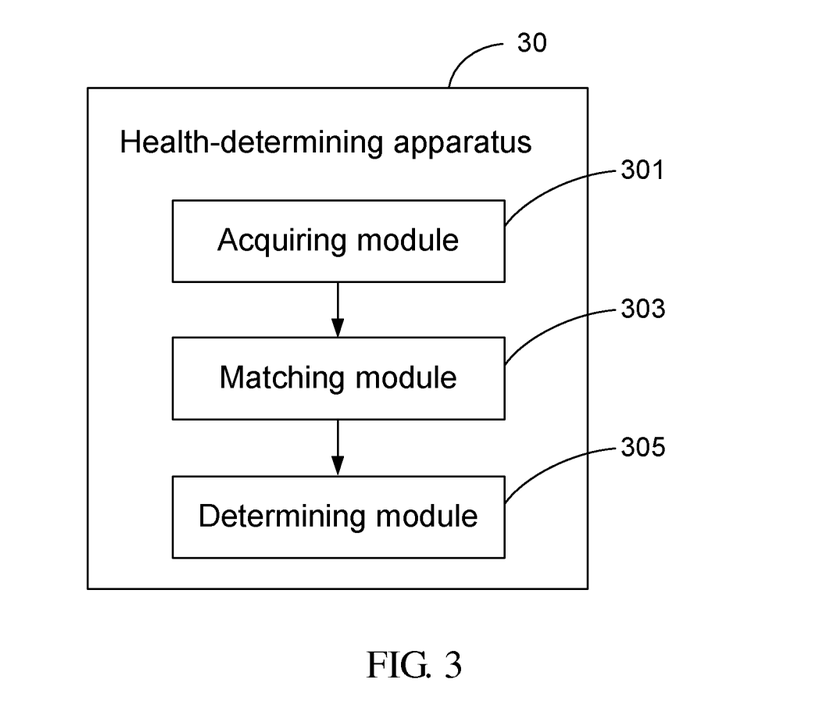
FIG. 3 is a schematic diagram illustrating a health-determining apparatus according to an embodiment of the present invention.

Please refer to FIG. 3, a schematic diagram illustrating a health-determining apparatus according to an embodiment of the present invention. The health-determining apparatus 30 for determining a health state of an information system includes an acquiring module 301, a matching module 303 and a determining module 305.

The acquiring module 301 is configured to receive a baseline configuration document corresponding to the information system and acquire data records under inspection of the information system. The baseline configuration document defines baselines.

In an embodiment, the information system (not shown) may be a data center system or an office information system. The baseline is a predetermined standard which can prevent the information system from insecurity or damage.

The matching module 303 is configured to compare each of the data records under inspection with at least one baseline defined in the baseline configuration document to obtain a comparing result between each data record under inspection and the at least one baseline. The comparing result between the data record under inspection and the baseline represents whether the data record under inspection meets or matches the baseline.

The determining module 305 is configured to determine the health state of the information system according to the comparing result between each data record under inspection and the at least one baseline.

In summary, the health-determining apparatus for determining a health state of an information system compares each data record under inspection with at least one baseline defined in the baseline configuration document to obtain a comparing result between each data record under inspection and at least one baseline. The health state of the information system is determined according to the comparing result. The present health-determining apparatus provides an accurate and complete health state which solves the problems resulting from the conventional manual determination. Thus, the health state of the information system becomes a quantifiable indicator determined by automatic determination with advantage of rapid, convenience, accuracy and objectiveness. It is advantageous to production decision and security management of the information system. In addition, greater efficiency of security management and lower security cost without planless waste are achieved.

Figure 4:
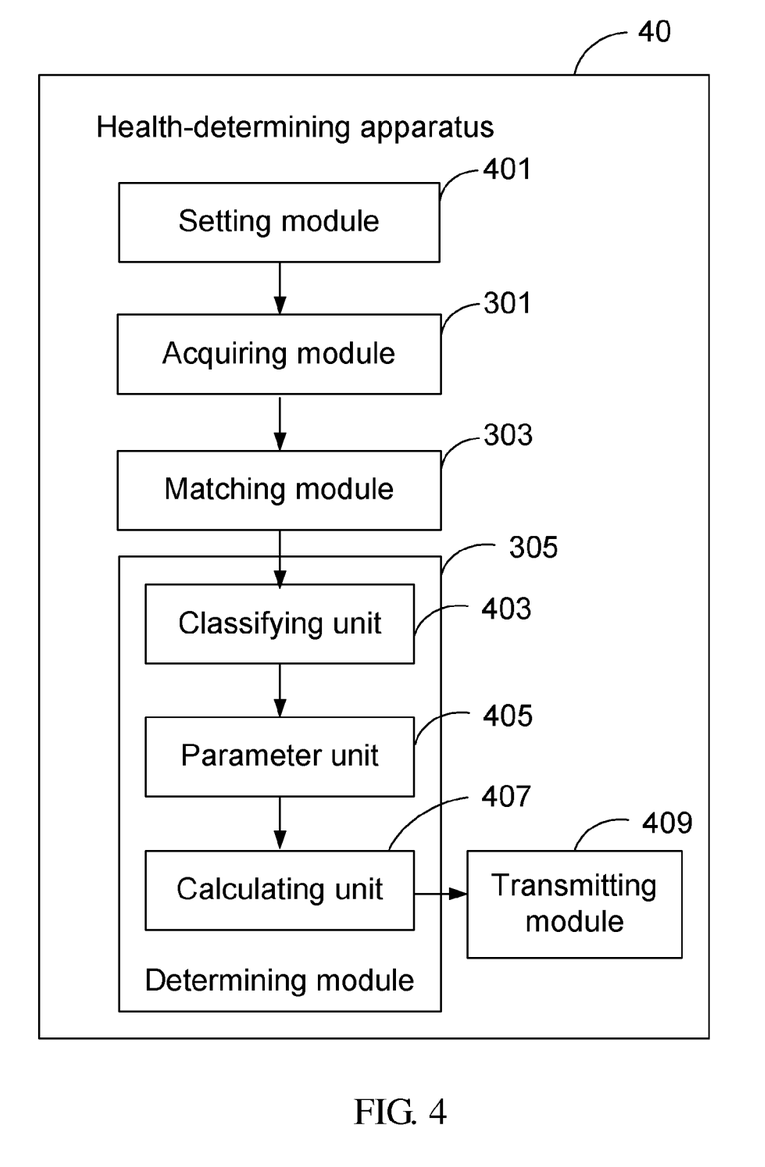
FIG. 4 is a schematic diagram illustrating a health-determining apparatus according to another embodiment of the present invention.

Please refer to FIG. 4, a schematic diagram illustrating a health-determining apparatus according to another embodiment of the present disclosure. In addition to the modules of the health-determining apparatus 30, the health-determining apparatus 40 for determining a health state of an information system further includes a setting module 401 and a transmitting module 409.

The setting module 401 is configured to associate each information system with a baseline configuration document defining the baselines. Then, the acquiring module 301 receives the associated baseline configuration according to the information system under inspection.

In an embodiment, the determining module 305 includes a classifying unit 403, a parameter unit 405 and a calculating unit 407.

The classifying unit 403 is configured to classify the baselines into several types according to risk levels of the baselines in advance. Each type of the baselines corresponds to a predetermined factor. The comparing result includes the number of the matched baselines relative to the data records under inspection in each type.

The parameter unit 405 is configured to obtain the parameters of a formula of health state according to the number of the matched baselines relative to the data records under inspection in each type and each corresponding factor.

If the baselines are classified into n types according to risk levels of the baselines (n is a positive integer), the parameter unit 405 gets the formula of health state:

$$\sum_{n=1}^{m}\left(\frac{\text{number of matched baselines in type }Bn}{\text{total number of baselines in type }Bn} * Bn \text{ factor}\right) \quad (1)$$

wherein m=1, 2, . . . , n; Bn is the baseline indicator; and Bn factor is a predetermined factor corresponding to type Bn.

Optionally, the parameter unit 405 is configured to decide the value of m according to the following rules while the baselines are classified into five types, wherein the risk level of type-1 baselines is greater than the risk level of type-2 baselines:

a. if there is any unmatched baseline relative to the data records under inspection in type B1 (type-1 baseline), m=1;

b. if there is no unmatched baseline relative to the data records under inspection in type B1 (type-1 baseline), but there is any unmatched baseline relative to the data records under inspection in type B2 (type-2 baseline), m=2; and c. if there is no unmatched baseline relative to the data records under inspection in type B1 and type B2, m=5.

The calculating unit 407 is configured to calculate the health state of the information system according to the parameters and the formula of health state.

The transmitting module 409 is configured to transmit the health state of the information system to the information system. The health state may be viewed or monitored through each terminal of the information system.

In summary, the health-determining apparatus associates each information system with a baseline configuration document, and notifies the information system of the health state thereof. The connection between each information system and associated baseline configuration document can be adjusted at any time to meet real requirements. Thus, the operation of the health-determining apparatus is flexible and convenient. In addition, the health state of the information system may be viewed or monitored through each terminal of the information system as required.

Figure 5:
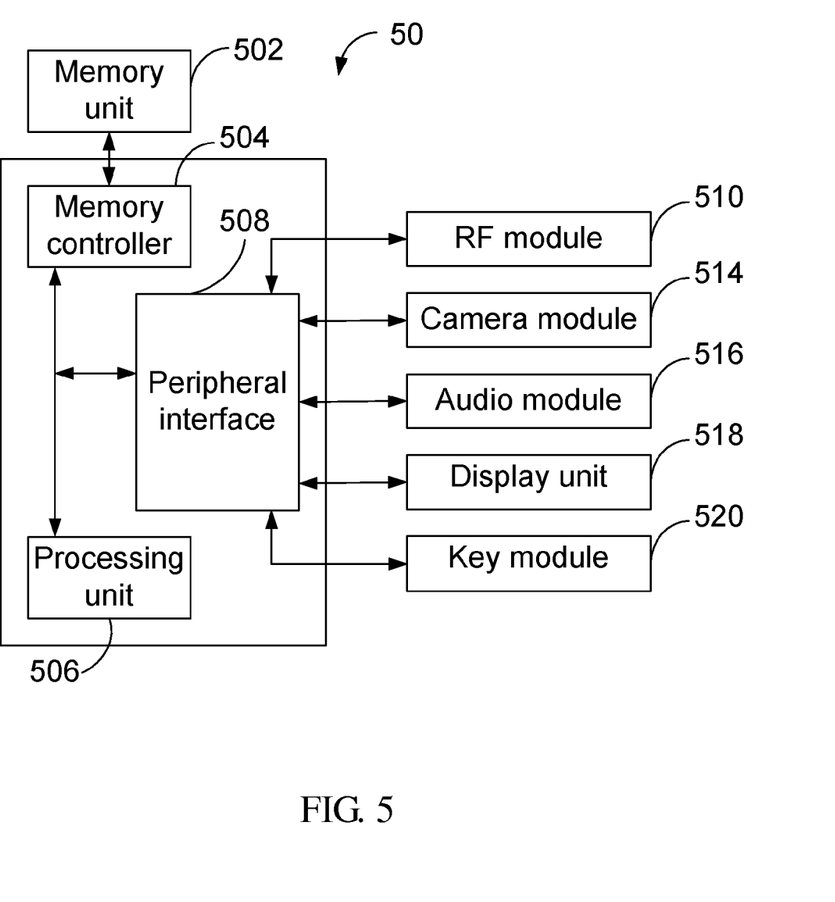
FIG. 5 is a block diagram illustrating a terminal with which some embodiments of the present application are implemented.

Please refer to FIG. 5, a block diagram illustrating a computer with which some embodiments of the present application are implemented. The computer 50 may include, but not limited to, a memory unit 502, a memory controller 504, at least one processing unit 506, a peripheral interface 508, a RF module 510, a camera module 514, an audio module 516, a display unit 518 and a key module 520. These modules are in communication with each other through at least one bus or signal line. It is understood that the structure of the computer 50 shown in FIG. 5 is not an exact terminal structure, and more or fewer components may be included in the computer 50 to meet different requirements. The components may be employed in hardware, software, or combination thereof.

The memory unit 502 is a computer-readable storage medium, configured to store data, executable instructions of the methods for determining the health state of the information system or modules (e.g. the acquiring module 301, matching module 303, determining module 305, setting module 401, classifying module 403, parameter module 405, calculating module 407 and transmitting module 409) of the health-determining apparatuses provided in the embodiments of the present invention. The memory unit 502 may be a volatile memory or a non-volatile memory including at least one of a read-only-memory (ROM), a system memory and a permanent storage device. Some embodiments of the invention use a mass-storage device (such as a magnetic disk or an optical disk and its corresponding disk drive) or a removable storage device (e.g. USB flash drive) as the permanent storage device. In some embodiment, the memory unit 502 may further include a separately installed memory which is in communication with the computer 50 through a local area network (LAN), a wide area network (WAN), a mobile communication network, or an Intranet with a wired or wireless mode. The processing unit 506 and other components may access the memory unit 502 under control of the memory controller 504.

The processing unit 506 retrieves instructions and data from the memory unit 502 to execute and process the method for determining the health state of the information system or perform the modules of the health-determining apparatus provided in the embodiments of the invention. The processing unit 506 may be a single processor or a multi-core processor in different embodiments. Some instructions about image processing are executed by a graphics processing unit.

The peripheral Interface 508 couples various input/output devices to the memory unit 502 and the processing unit 506. In some embodiments, the peripherals interface 508, the processing unit 506 and the memory controller 504 may be implemented in a single chip. In some other embodiments, they may be implemented in separate chips.

The RF module 510 is configured to receive and transmit signals so that the computer 50 can communicate with other devices or communication network. The RF module 510 may include a variety of known circuit elements for performing these functions, e.g. an antenna, a RF transceiver, a digital signal processor, an encryption/decryption chip, a subscriber identity module (SIM) card, a memory, etc. The RF module 510 can be used with a variety of networks such as the Internet, intranet or wireless communication network. The wireless network can use a variety of communication standards, protocols and technologies, including, but not limited to Global System for Mobile Communication (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (IEEE802.11a, IEEE802.11b, IEEE802.11g and/or IEEE802.11n standard), Voice over internet protocol (VoIP), Worldwide Interoperability for Microwave Access (WiMax), protocols for email, instant messaging and short message service, as well as any other suitable communication protocol, even including those agreements currently still being developed.

The camera module 514 takes photos or videos which may be stored in the memory unit 502, and transmitted through the RF module 510.

The audio module 516 may include one or more of a microphone, a speaker, and an audio circuit. The audio circuit receives audio data from the peripheral interface 508, converts the audio data to electric signals, and then transmits the electric signals to the speaker, which issues sound waves detectable to the human ear. On the other hands, the audio circuit receives electric signals from the microphone, converts the electrical signals into audio data, and transmits the audio data to the peripheral interface 508 for further processing. The audio data may be retrieved from the memory unit 502 or received through the RF module 510. Further, the audio data can be stored in the memory unit 502 or transmitted through the RF module 510. In some examples, the audio module 516 may further include a headphone jack for providing an interface to a headset or other audio devices.

The display unit 518 is a human-computer input/output interface. Specifically, the display unit 518 shows video output to the user, and the video output may include text, graphics, video data, virtual keyboard and any combination thereof. The display unit 518 may be a touch screen receiving input from the user, such as clicking and sliding gestures. The touch screen may detect the user input based on resistive, capacitive or any other possible touch detection techniques. Specific examples of the display unit 518 may include, but not limited to a liquid crystal display or a light emitting polymer display.

The key module 520 is an input interface to the computer 50. The user can press specific keys to enable the computer 50 to perform specific functions.

It is to be noted that the computer in the embodiments of the invention may be a personal computer, a notebook, an intelligent phone or a server with communication function, etc. As used in this specification and any claims of this application, the terms "computer", "unit", "device", "apparatus" and "system" refer to electronic devices. These terms exclude people or groups of people.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for optimizing an information system in a computer, the computer comprising a processor operating in conjunction with a memory, the method comprising:
   receiving, by the processor, a baseline configuration document corresponding to the information system and acquiring data records under inspection of the information system, the baseline configuration document defining a plurality of baselines;
   comparing, by the processor, each of the data records under inspection with at least one baseline defined in the baseline configuration document to obtain a comparing result between each of the data records under inspection and the at least one baseline;
   determining, by the processor, a health state of the information system according to the comparing result between each of the data records under inspection and the at least one baseline; and
   optimizing, by the processor, the information system according to the health state of the information system;
   wherein the determining the health state of the information system comprises:
      classifying the baselines into a plurality of types according to risk levels of the baselines, each type of the baselines corresponding to a predetermined factor, the comparing result including a number of matched baselines relative to the data records under inspection in each type;
      obtaining parameters of a formula of health state according to the number of the matched baselines relative to the data records under inspection in each type and each corresponding factor, and
      calculating the health state of the information system according to the parameters and the formula of health state;
   wherein the baselines are classified into n types according to the risk levels of the baselines, the formula of health state being:

$$\sum_{n=1}^{m} \left( \frac{\text{number of matched baselines in type } Bn}{\text{total number of baselines in type } Bn} * Bn \text{ factor} \right)$$

wherein n is a positive integer, Bn is baseline indicators of respective types, m is an integer selected from 1 to n, and Bn factor is a predetermined factor corresponding to type Bn; and
   wherein the baselines are classified into five types and m is decided by:
      if there is any unmatched baseline relative to the data records under inspection in type B1, m=1;
      if there is no unmatched baseline relative to the data records under inspection in type B1 and there is any unmatched baseline relative to the data records under inspection in type B2, m=2; and
      if there is no unmatched baseline relative to the data records under inspection in type B1 and type B2, m=5,
      wherein the risk level of the baselines in type B1 is greater than the risk level of the baselines in type B2.

2. The method according to claim 1, further comprising:
   associating each information system with a baseline configuration document; and
   receiving the associated baseline configuration document associated with the information system under inspection.

3. The method according to claim 1, wherein each of the baselines is a predetermined standard preventing the information system from insecurity or damage.

4. The method according to claim 1, further comprising a step of transmitting the health state of the information system to the information system.

5. A device for optimizing an information system in a computer, the device comprises a processor operating in conjunction with a memory storing program codes, wherein the processor is configured to execute the stored program codes to:
   receive a baseline configuration document corresponding to the information system and acquire data records under inspection of the information system, the baseline configuration document defining a plurality of baselines;
   compare each of the data records under inspection with at least one baseline defined in the baseline configuration document to obtain a comparing result between each of the data records under inspection and the at least one baseline;
   determine a health state of the information system according to the comparing result between each of the data records under inspection and the at least one baseline; and
   optimize, by the processor, the information system according to the health state of the information system;
   wherein the processor is further configured to execute the stored program codes to:
      classify the baselines into a plurality of types according to risk levels of the baselines, each type of the baselines corresponding to a predetermined factor, the comparing result including a number of matched baselines relative to the data records under inspection in each type;

obtain parameters of a formula of health state according to the number of the matched baselines relative to the data records under inspection in each type and each corresponding factor; and calculate the health state of the information system according to the parameters and the formula of health state;

wherein the baselines are classified into n types according to the risk levels of the baselines, the formula of health state being:

$$\sum_{n=1}^{m}\left(\frac{\text{number of matched baselines in type } Bn}{\text{total number of baselines in type } Bn} * Bn \text{ factor}\right)$$

wherein n is a positive integer, Bn is baseline indicators of respective types, and m is an integer selected from 1 to n, and Bn factor is a predetermined factor corresponding to type Bn; and wherein the baselines are classified into five types and m is decided by:
  if there is any unmatched baseline relative to the data records under inspection in type B1, m=1;
  if there is no unmatched baseline relative to the data records under inspection in type B1 and there is any unmatched baseline relative to the data records under inspection in type B2, m=2; and
  if there is no unmatched baseline relative to the data records under inspection in type B1 and type B2, m=5,
  wherein the risk level of the baselines in type B1 is greater than the risk level of the baselines in type B2.

6. The device according to claim 5, wherein the processor is configured to execute the program codes to associate each information system with a baseline configuration document, and wherein the processor is further configured to execute the program codes to receive the baseline configuration associated with the information system under inspection.

7. The device according to claim 5, wherein each of the baselines is a predetermined standard preventing the information system from insecurity or damage.

8. The device according to claim 5, wherein the processor is further configured to execute the program codes to transmit the health state of the information system to the information system.

9. A non-transitory computer-readable storage medium storing instructions for optimizing an information system in a computer, the computer comprising a processor operating in conjunction with a memory, the instructions, when executed by the processor, causing the processor to perform a method comprising:

receiving a baseline configuration document corresponding to the information system and acquiring data records under inspection of the information system, the baseline configuration document defining a plurality of baselines;

comparing each of the data records under inspection with at least one baseline defined in the baseline configuration document to obtain a comparing result between each of the data records under inspection and the at least one baseline;

determining a health state of the information system according to the comparing result between each of the data records under inspection and the at least one baseline; and optimizing, by the processor, the information system according to the health state of the information system;

wherein the determining the health state of the information system comprises sub-steps of:
  classifying the baselines into a plurality of types according to risk levels of the baselines, each type of the baselines corresponding to a predetermined factor, the comparing result including a number of matched baselines relative to the data records under inspection in each type;
  obtaining parameters of a formula of health state according to the number of the matched baselines relative to the data records under inspection in each type and each corresponding factor: and
  calculating the health state of the information system according to the parameters and the formula of health state;

wherein the baselines are classified into n types according to the risk levels of the baselines, the formula of health state being:

$$\sum_{n=1}^{m}\left(\frac{\text{number of matched baselines in type } Bn}{\text{total number of baselines in type } Bn} * Bn \text{ factor}\right)$$

wherein n is a positive integer, Bn is baseline indicators of respective types, m is an integer selected from 1 to n, and Bn factor is a predetermined factor corresponding to type Bn; and wherein the baselines are classified into five types and m is decided by:
  if there is any unmatched baseline relative to the data records under inspection in type B1, m=1;
  if there is no unmatched baseline relative to the data records under inspection in type B1 and there is any unmatched baseline relative to the data records under inspection in type B2, m=2; and
  if there is no unmatched baseline relative to the data records under inspection in type B1 and type B2, m=5,
  wherein the risk level of the baselines in type B1 is greater than the risk level of the baselines in type B2.

10. The computer-readable storage medium as claimed in claim 9, wherein the method further comprises:
  associating each information system with a baseline configuration document; and
  receiving the baseline configuration document associated with the information system under inspection.

11. The computer-readable storage medium as claimed in claim 9, wherein each of the baselines is a predetermined standard preventing the information system from insecurity or damage.

12. The method of claim 1, further comprising:
  transmitting the health state to the information system for viewing or monitoring via the information system.

* * * * *